(12) United States Patent
Murakami et al.

(10) Patent No.: US 8,661,445 B2
(45) Date of Patent: Feb. 25, 2014

(54) INFORMATION-PROCESSING DEVICE AND PROGRAM

(75) Inventors: Keiichi Murakami, Tokyo (JP); Dai Kamiya, Tokyo (JP); Yasushi Onda, Tokyo (JP); Izua Kano, Tokyo (JP); Kazuhiro Yamada, Tokyo (JP); Naoki Hashida, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 147 days.

(21) Appl. No.: 13/061,738

(22) PCT Filed: Sep. 8, 2009

(86) PCT No.: PCT/JP2009/065680
§ 371 (c)(1),
(2), (4) Date: Mar. 2, 2011

(87) PCT Pub. No.: WO2010/027089
PCT Pub. Date: Mar. 11, 2010

(65) Prior Publication Data
US 2011/0173627 A1    Jul. 14, 2011

(30) Foreign Application Priority Data
Sep. 8, 2008   (JP) ................................ 2008-230239

(51) Int. Cl.
  *G06F 9/46*    (2006.01)
(52) U.S. Cl.
  USPC .......................................... 718/103; 718/108
(58) Field of Classification Search
  None
  See application file for complete search history.

(56) References Cited

U.S. PATENT DOCUMENTS

| | | | |
|---|---|---|---|
| 7,251,255 B1 * | 7/2007 | Young ........................... | 370/468 |
| 2004/0194153 A1 * | 9/2004 | Garg et al. ................... | 725/151 |
| 2005/0223352 A1 * | 10/2005 | Nishida ....................... | 717/100 |
| 2007/0050449 A1 * | 3/2007 | Beck ........................... | 709/204 |
| 2007/0169125 A1 * | 7/2007 | Qin ............................. | 718/102 |
| 2008/0168235 A1 | 7/2008 | Watson et al. | |
| 2009/0144756 A1 * | 6/2009 | Inami .......................... | 719/318 |
| 2010/0122257 A1 | 5/2010 | Wada | |
| 2012/0042317 A1 * | 2/2012 | Nguyen et al. ............... | 718/102 |

FOREIGN PATENT DOCUMENTS

| | | |
|---|---|---|
| JP | 06-266524 | 9/1994 |
| JP | 2000-039948 | 2/2000 |
| JP | 2000-293386 | 10/2000 |
| JP | 2003-015892 | 1/2003 |
| JP | 2006-107197 | 4/2006 |
| JP | 2008-097425 | 4/2008 |
| JP | 2008-186167 | 8/2008 |
| WO | 2008091008 A1 | 7/2008 |

OTHER PUBLICATIONS

PCT International Search Report; International Application No. PCT/JP2009/065680; Date Mailed Nov. 17, 2009.

(Continued)

*Primary Examiner* — Emerson Puente
*Assistant Examiner* — Mehran Kamran
(74) *Attorney, Agent, or Firm* — MKG, LLC

(57) ABSTRACT

When executing plural application programs in parallel, a control unit assigns a small storage area to each application program so that a part of a function implemented by execution of each application program is provided. When providing a service of high value to a user, a control unit assigns a large storage area to any one of the application programs so that a full function that is implemented by execution of the application program is provided.

8 Claims, 7 Drawing Sheets

(56) References Cited

OTHER PUBLICATIONS

Notification of Reasons for Rejection issued in Japanese Patent Application No. 2008-230239 issued on Oct. 2, 2012.

Supplementary European Search Report issued in EP Patent Application No. 09811612.2 mailed on Jun. 11, 2013.
Examination Report issued in EP Patent Application No. 09811612.2 mailed on Jun. 28, 2013.

* cited by examiner

| WIDGET ID | EXECUTION STATE |
|---|---|
| 001 | PARTIALLY EXECUTED STATE |
| 002 | PARTIALLY EXECUTED STATE |
| 003 | PARTIALLY EXECUTED STATE |
| 004 | PARTIALLY EXECUTED STATE |
| 005 | PARTIALLY EXECUTED STATE |

| WIDGET ID | EXECUTION STATE |
|---|---|
| 001 | FULLY EXECUTED STATE |

(b)

| WIDGET ID | EXECUTION STATE |
|---|---|
| 001 | PARTIALLY EXECUTED STATE |

(c)

| WIDGET ID | EXECUTION STATE |
|---|---|
| 001 | NOT-EXECUTED STATE |
| 002 | FULLY EXECUTED STATE |

(d)

| WIDGET ID | EXECUTION STATE |
|---|---|
| 001 | PARTIALLY EXECUTED STATE |
| 002 | PARTIALLY EXECUTED STATE |

(e)

| WIDGET ID | EXECUTION STATE |
|---|---|
| 001 | PARTIALLY EXECUTED STATE |
| 002 | PARTIALLY EXECUTED STATE |
| 003 | PARTIALLY EXECUTED STATE |
| 004 | PARTIALLY EXECUTED STATE |
| 005 | PARTIALLY EXECUTED STATE |
| 006 | PARTIALLY EXECUTED STATE |
| 007 | PARTIALLY EXECUTED STATE |
| 008 | PARTIALLY EXECUTED STATE |

(f)

| WIDGET ID | EXECUTION STATE |
|---|---|
| 001 | NOT-EXECUTED STATE |
| 002 | NOT-EXECUTED STATE |
| 003 | NOT-EXECUTED STATE |
| 004 | NOT-EXECUTED STATE |
| 005 | NOT-EXECUTED STATE |
| 006 | NOT-EXECUTED STATE |
| 007 | NOT-EXECUTED STATE |
| 008 | NOT-EXECUTED STATE |
| 009 | FULLY EXECUTED STATE |

(g)

| WIDGET ID | EXECUTION STATE |
|---|---|
| 001 | PARTIALLY EXECUTED STATE |
| 002 | PARTIALLY EXECUTED STATE |
| 003 | PARTIALLY EXECUTED STATE |
| 004 | PARTIALLY EXECUTED STATE |
| 005 | PARTIALLY EXECUTED STATE |
| 006 | PARTIALLY EXECUTED STATE |
| 007 | PARTIALLY EXECUTED STATE |
| 008 | PARTIALLY EXECUTED STATE |

INFORMATION-PROCESSING DEVICE AND PROGRAM

TECHNICAL FIELD

The present invention relates to a control to execute an application program.

BACKGROUND

A multi-window system in which plural windows can be displayed is known. In such a multi-window system, in a case where each window corresponds to an application program, and plural windows are displayed, plural application programs are running in parallel. To determine an arrangement of windows in a multi-window system, techniques described in patent documents 1 and 2 are known. The techniques are for arranging windows according to a predetermined algorithm depending on an area of a window, or a number of windows to be displayed, to improve visibility and operability.

In a small information-processing device such as a mobile phone, memory capacity is limited. Therefore, in a case where such an information-processing device implements a multi-window system, a number of application programs that can be executed in parallel is limited. Recently, such information-processing devices have become increasingly sophisticated, and the level of services required by a user or value of services to a user becomes higher. However, a storage area of a memory that is required by an application program for providing such a service has to be increased accordingly. Thus, it is likely that a situation occurs that only a single application program can be executed. However, user demand for parallel execution of plural application programs is high.

SUMMARY

The present invention has an object to provide both an environment for responding to a user's demand for a variety of uses by executing plural application programs, and an environment for providing satisfactory service to a user by executing an application program.

In an embodiment, the present invention provides an information-processing device including: a memory; execution means for assigning all or a part of a storage area of the memory to each of a plurality of application programs, to execute the application program; and storage means for storing first identification information that represents a state in which an application program is running, or second identification information that represents a state in which execution of an application program is suspended, for each application program, wherein: (a) in a case where at least one first application program is running, a number of the first identification information stored in the storage means is smaller than an upper limit, and a second application program is to be executed, the execution means: suspends execution of the first application program, and rewrites identification information of the at least one first application program that is stored in the storage means, as the second identification information, assigns the entire storage area to the second application program, to execute the second application program, and when the second application program is running, and an instruction to execute the first application program has been received, assigns a part of the storage area to each of the at least one first application program and the second application program, to execute the application programs in parallel, and rewrites identification information of each of the at least one first application program and the second application program, as the first identification; and (b) in a case where the at least one first application program is running, a number of the first identification information stored in the storage means is equal to the upper limit, and the second application program is to be executed, the execution means: suspends execution of the at least one first application program, and rewrites identification information of the first application program that is stored in the storage means, as the second identification information, assigns the entire storage area of the memory to the second application program, to execute the second application program, and when the second application program is running, and an instruction to execute the at least one first application program has been received, ends the second application program, and assigns a part of the storage area to each of the at least one first application program, to execute the first application program in parallel, and rewrites identification information of the at least one first application program, as the first identification information.

In a preferred embodiment, in the case (b), if an instruction has been received to execute the at least one first application program whose execution is suspended, the execution means: identifies a third application program that has a lower priority level among application programs for which the second identification information is written, and ends execution of the third application program, instead of ending execution of the second application program; and assigns a part of the storage area to each of the running second application program and the at least one first application program for which the second identification information is written, other than the third application program, to execute the application programs in parallel, and updates identification information of the application programs to which the part of the storage area is assigned, to the first identification information.

In a preferred another embodiment, the execution means specifies, based on a period in which the first identification information or the second identification information related to an application program is stored, a priority level of the application program.

In a preferred another embodiment, the execution means specifies, based on a period in which one application program is executed after execution of another application is suspended, a priority level of the one application program.

In a preferred another embodiment, the execution means specifies, based on a number of times the first identification information or the second identification information related to an application program is stored, a priority level of the application program. In a preferred another embodiment, the execution means specifies, based on a number of times one application program is executed after execution of another application program is suspended, a priority level of the one application program.

In another embodiment, the present invention provides an information-processing device including: a memory; execution means for assigning all or a part of a storage area of the memory to each application program, to execute the application program; and storage means for storing any one of first identification information that represents a full execution state in which an application program can perform all of its function, second identification information that represents a partial execution state in which an application program can perform a part of its function, and third identification information that represents a state in which execution of an application program is suspended, for each application program, wherein (a) in a case where at least one first application program is running, a number of items of the second identification information stored in the storage means is smaller than an upper limit, and a second application program is to be executed, the execution means: suspends execution of the first application program, rewrites identification information of the first application program stored in the storage means, as the third identification information, assigns the entire storage area to the second application program, to execute the second application program in the partial execution state, and rewrites identification information of the second application program as the first identification information, and when the second application program is running, and an instruction to execute the first application program has been received, assigns a part of the storage area to each of the at least one first application program and the second application program, to execute the application programs in parallel in the partial execution state, and rewrites identification information of each of the at least one first application program and the second application program, as the second identification; and (b) in a case where the at least one first application program is running, a number of items of the second identification information stored in the storage means is equal to the upper limit, and the second application program is to be executed, the execution means: suspends execution of the at least one first application program, rewrites identification information of the at least one first application program that is stored in the storage means, as the second identification information, assigns the entire storage area of the memory to the second application program, to execute the second application program in the full execution state, and rewrites identification information of the second application program as the first identification information, and when the second application program is running, and an instruction to execute the at least one first application program has been received, ends the second application program, assigns a part of the storage area to each of the at least one first application program, to execute the first application program in parallel in the partial execution state, and rewrites identification information of the at least one first application program, as the second identification information.

BRIEF DESCRIPTION OF THE DRAWINGS

FIG. 6 is a diagram showing a widget control table.

DETAILED DESCRIPTION

Figure 1:
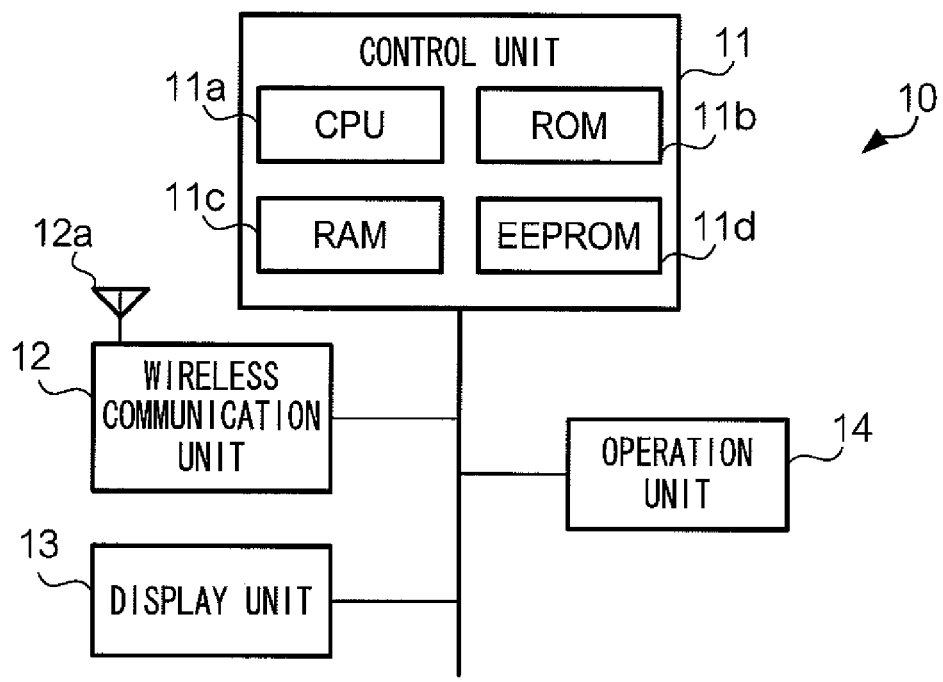
FIG. 1 is a block diagram showing a physical configuration of a communication terminal device.

FIG. 1 is a block diagram showing a physical configuration of a communication terminal device according to an embodiment of the present invention. As shown in the drawing, communication terminal device 10 includes control unit 11, wireless communication unit 12, display unit 13, and operation unit 14. It is to be noted that communication terminal device 10 according to the present embodiment is a mobile phone having a means for inputting and outputting a voice (not shown) such as a microphone and a speaker.

Control unit 11 includes CPU (Central Processing Unit) 11$a$, ROM (Read Only Memory) 11$b$, RAM (Random Access Memory) 11$c$, and EEPROM (Electronically Erasable and Programmable ROM) 11$d$. CPU 11$a$ is an execution means for executing a program stored in ROM 11$b$ or EEPROM 11$d$ while using RAM 11$c$ as a work area. CPU 11$a$ controls an operation of each unit of communication terminal device 10 by executing the program. In other words, RAM 11$c$ serves as a memory that is assigned to an application program when CPU 11$a$ executes the application program. Wireless communication unit 12 includes antenna 12$a$, and performs wireless data communication with a predetermined mobile communication network. Display unit 13 includes a liquid crystal display and a liquid crystal driving circuit, and displays an image in a display area based on display data provided from control unit 11. Operation unit 14 includes plural keys to receive an input operation by a user, and provides to control unit 11 operation information, which corresponds to the input operation. The keys may be so-called hard buttons. If communication terminal device 10 has a touch panel, the touch panel may receive such an operation instruction.

ROM 11$b$ pre-stores some programs. Hereinafter, the programs will be referred to as "preinstalled programs." The preinstalled programs include a multitask operating system (hereinafter referred to as "multitask OS"), a Java™ platform, and native application programs. The multitask OS is an operating system that supports functions such as assignment of a virtual memory space that are necessary to realize pseudo-parallel execution of plural tasks. The Java platform is a set of programs that are described in accordance with a CDC (Connected Device Configuration), which is a configuration for realizing Java Runtime Environment 140 (described later) in communication terminal device 10 in which the multitask OS is installed. The native application programs are programs for realizing a basic function of communication terminal device 10 such as a telephone call.

EEPROM 11$d$ includes Java application program storage areas for storing Java application programs. A Java application program includes a JAR (Java Archive) file that is a combination of a substance program that describes a procedure in a Java Runtime Environment, and image files or audio files that are used when the substance program is executed; and an ADF (Application program Descriptor File) in which properties of installation and start-up of the JAR file are described. The Java application program is prepared by a content provider or a carrier, and stored in an external server device, and can be downloaded from the server device on request by communication terminal device 10.

Figure 2:
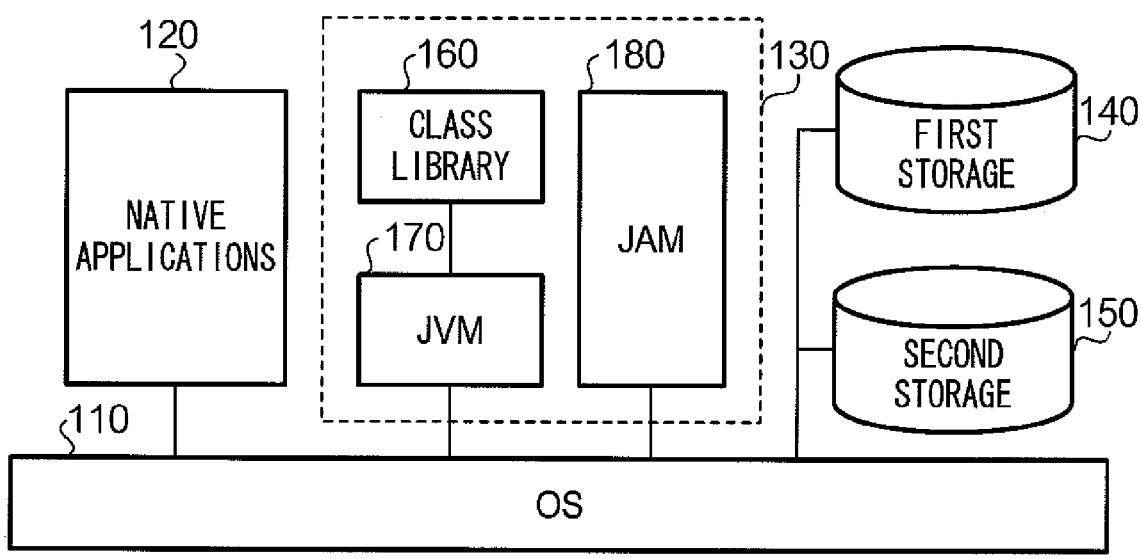
FIG. 2 is a diagram showing a logical configuration of a communication terminal device.

FIG. 2 is a diagram showing a logical configuration of units realized by control unit 11 of communication terminal device 10 by executing programs stored in ROM 11$b$ and EEPROM 11$d$. As shown in the drawing, in communication terminal device 10 that executes the programs, native application programs 120 and Java Runtime Environment 130 are realized in OS 110, and first storage 140 and second storage 150 are secured in EEPROM 11$d$.

Java Runtime Environment 130 is realized by use of the Java platform stored in ROM 11$b$. Java Runtime Environment 130 includes class library 160, JVM (Java Virtual Machine) 170, and JAM (Java Application program Manager) 180. Class library 160 is a file of a combination of program modules (classes) that have a particular function. JVM 170 is a Java Runtime Environment that is optimized for the CDC described above, and has a function of interpreting and executing bite codes provided as a Java application program. JAM 180 has a function of managing downloading, installation, start-up, and end of Java application programs.

First storage 140 is an area for storing Java application programs, each of which includes a JAR file and an ADF, which are downloaded under control of JAM 180. Second storage 150 is an area in which an individual storage area is assigned to each installed Java application program, and is used for storing data generated during running of Java application programs after the application programs end. Data of a certain Java application program in a storage area assigned to the Java application program can be rewritten only when the application program is running; therefore, the data cannot be rewritten by another Java application program.

Java application programs of the present embodiment include application programs for displaying plural windows. The Java application programs for displaying plural windows include a "list display application program" and a "widget." The list display application program is an application program for displaying one or more windows in a display area of display unit 13, and controlling display of the windows. The "widget" is an application program that realizes a predetermined function only when the list display application program displays a window.

In the following description, a screen on which a list of windows that corresponds to one or more widgets is displayed is referred to as "list display screen." In the present embodiment, "window" refers to a part of a display area of display unit 13 that is assigned to a certain widget. The window is displayed as an image that can be distinguished from an image in another part of the display area. The shape and size of the window depend on a widget to which the window is assigned.

In the present embodiment, plural widgets appear, each widget realizing a different function. The widgets include, for example, a widget for displaying a time and date by displaying a clock image in a window (hereinafter referred to as "clock widget"), a widget for displaying characters input by a user in a window as a memorandum (hereinafter referred to as "memo widget"), a widget for playing a video or music (hereinafter referred to as "play widget"), or a widget for playing a computer game (hereinafter referred to as "game widget"). Also, the widgets may include a widget that acquires information such as news or weather forecast via wireless communication unit 12 at a predetermined time, and displays the acquired information.

The foregoing is a description of the configuration of communication terminal device 10 according to the present embodiment. Communication terminal device 10 having such a configuration executes plural application programs in response to a request input by a user. Communication terminal device 10 according to the present embodiment realizes a multi-window system by displaying windows of widgets. Namely, communication terminal device 10 runs a list display application program when displaying a list display screen on which plural windows appear. A user can select one from among plural windows displayed on the list display screen by operating a cursor key of operation unit 14. Control unit 11 selects at least one from among plural windows displayed on display unit 13 in accordance with a signal output from operation unit 14. It is to be noted that in the present embodiment the "selection" of a window means specifying a window of focus.

Communication terminal device 10 sets a widget corresponding to a user-selected window to a state in which the widget carries out an operation that is different from an operation carried out when the window has not been selected. Namely, each widget is able to carry out different operations depending on whether a window corresponding to the widget has been selected. Specifically, when a window is selected, communication terminal device 10 performs processing by setting a widget corresponding to the window to a state in which a full function is executed (hereinafter, referred to as "fully executed state"); when a window is not selected, communication terminal device 10 performs processing by setting a widget corresponding to the window to a state in which a part of the function is executed (hereinafter, referred to as "partially executed state"). When a widget is to be fully executed, control unit 11 refers to an entire procedure described in the widget, and performs processing according to the procedure. On the other hand, when a widget is to be partially executed, control unit 11 refers to a predetermined part of a procedure described in the widget, and performs processing according to that part of the procedure.

For example, the clock widget is able to carry out an operation to display a time and date in the partially executed state, and is able to carry out an operation to change the time and date or an appearance such as a form or color in the fully executed state. The memo widget is able to carry out an operation to display characters in the partially executed state, and is able to carry out an operation to change characters in the fully executed state. The play widget is able to carry out an operation to play a video or music in the partially executed state, and is able to carry out an operation to control the volume, or pause or fast-forward a video or music in the fully executed state. The game widget is able to carry out an operation to put a game in a state of rest and display an image of the state in the partially executed state, and is able to carry out an operation to play the game in the fully executed state. The operations are carried out depending on an execution state of each widget in accordance with an operation by a user. For example, when a user performs an operation to set a clock, the time is changed accordingly.

In various services provided by a single widget, a service that can be implemented by simple processing is provided when the widget is partially executed, and a service that can be implemented by complicated processing is provided when the widget is fully executed. Simplicity or complexity of processing depends on an amount of a storage area of RAM 11c used in the processing. Therefore, when a widget is fully executed in communication terminal device 10, a large amount of storage area of RAM 11c is assigned to the widget; on the other hand, when a widget is partially executed, a small amount of storage area of RAM 11c is assigned to the widget. Accordingly, communication terminal device 10 can execute plural widgets simultaneously when the device executes the widgets partially. On the other hand, when a certain widget is fully executed, since a relatively large amount of storage area of RAM 11c is assigned to the widget, every function of the fully executed widget can be provided, although a function of another widget cannot be used simultaneously. As a result, it is possible to provide a higher level of service to a user.

Communication terminal device 10 executes a list display application program to display in a list display screen windows corresponding to widgets that are partially executed. If any of the widgets is fully executed, communication terminal device 10 displays a screen on which only a window corresponding to the widget appears (hereinafter referred to as "full execution screen") on display unit 13. A display aspect of a window is different depending on an execution state. For example, if a window displayed on the full execution screen is of a size corresponding to magnification "100%," a window of a partially executed widget, displayed on the list display screen is of a size corresponding to magnification "60%." If a user operates operation unit 14 to select a certain window while communication terminal device 10 displays a list display screen, communication terminal device 10 changes an execution state of a widget corresponding to the selected window from a partially executed state to a fully executed state. Also, communication terminal device 10 changes an execution state of a widget corresponding to a window other than the selected window from a partially executed state to a state in which execution is temporary suspended. Subsequently, communication terminal device 10 changes the "list display screen" that has been displayed on display unit 13 to the "full execution screen." On the other hand, if the "full execution screen" is changed to the "list display screen," communication terminal device 10 changes an execution state of the widget that is fully executed to a partially executed state, and changes an execution state of the widget whose execution is temporary suspended after the widget has been partially executed, to the partially executed state. As a result, a list display screen on which a window of a partially executed widget appears is displayed.

Figures 3, 4:
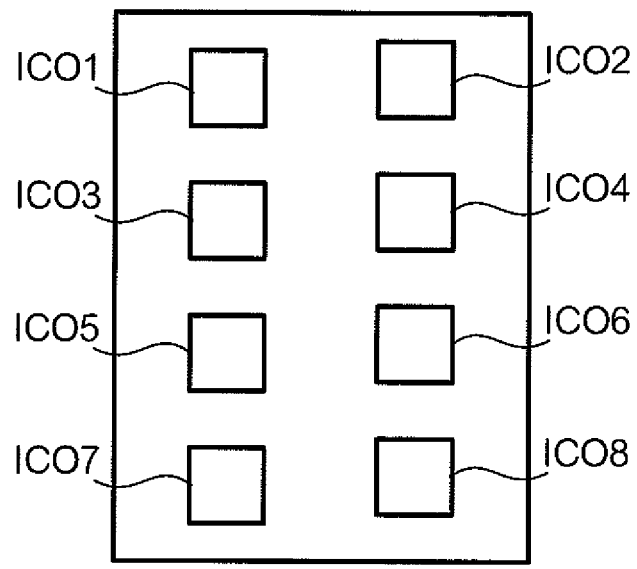
FIG. 3 is a diagram schematically showing a list screen.
FIG. 4 is a diagram showing a widget control table.

As for display of a widget, a screen called "list screen" is used in addition to the "list display screen" and "full execution screen" described above. On the "list screen," a list of all widgets that are executable by communication terminal device 10 is displayed. When a new widget is to be executed, communication terminal device 10 displays the "list screen" on display unit 13, and prompts a user to select a widget to be started. FIG. 3 shows a diagram schematically showing a list screen. On the list screen shown in the drawing, icons ICO1 to ICO8 corresponding to some of widgets that are executable by communication terminal device 10 are displayed. It is to be noted that if a user operates a down arrow key of operation unit 14, icons corresponding to other widgets are displayed (not shown). If any of the icons is selected via operation unit 14 by a user, communication terminal device 10 fully executes a widget corresponding to the icon.

The list display application program can suspend displaying a list of plural windows. For example, display of the list is suspended when communication terminal device 10 displays a full execution screen or a list screen while a list display screen is displayed by the list display application, and returns to the list display screen again to display a prior displayed content. In another case, if a user starts a telephone call while the list display screen is displayed, communication terminal device 10 carries out an interrupt processing to change the image displayed on display unit 13 to an image for a telephone call. When the telephone call is finished, communication terminal device 10 displays a list display screen again. To do so, control unit 11 of communication terminal device 10 stores in EEPROM 11d identification information (widget ID described later) of a running widget or a widget whose execution is interrupted, in a table format, referred to as a widget control table. When resuming display of the list display screen, communication terminal device 10 executes widgets in an execution state that is identical to their execution state before they were suspended, based on a content of the widget control table, and displays windows corresponding to the widgets.

FIG. 4 shows a diagram showing a configuration of a widget control table. As shown in FIG. 4, the widget control table associates "widget ID" with "execution state." In a field "widget ID," identification information for identifying a widget that is already executed by communication terminal device 10, such as the clock widget or the memo widget, is written. In a field "execution state," one of "partially executed state," "fully executed state," and "not-executed state" that means execution of a widget is temporarily suspended, is written. In a case of the widget control table shown in FIG. 4, communication terminal device 10 partially executes widgets corresponding to widget IDs "001" to "005." In this situation, communication terminal device 10 displays on display unit 13a list display screen on which a window corresponding to each of the widgets appears. Communication terminal device 10 updates the list display screen each time an execution state of a widget is changed.

Figure 5:
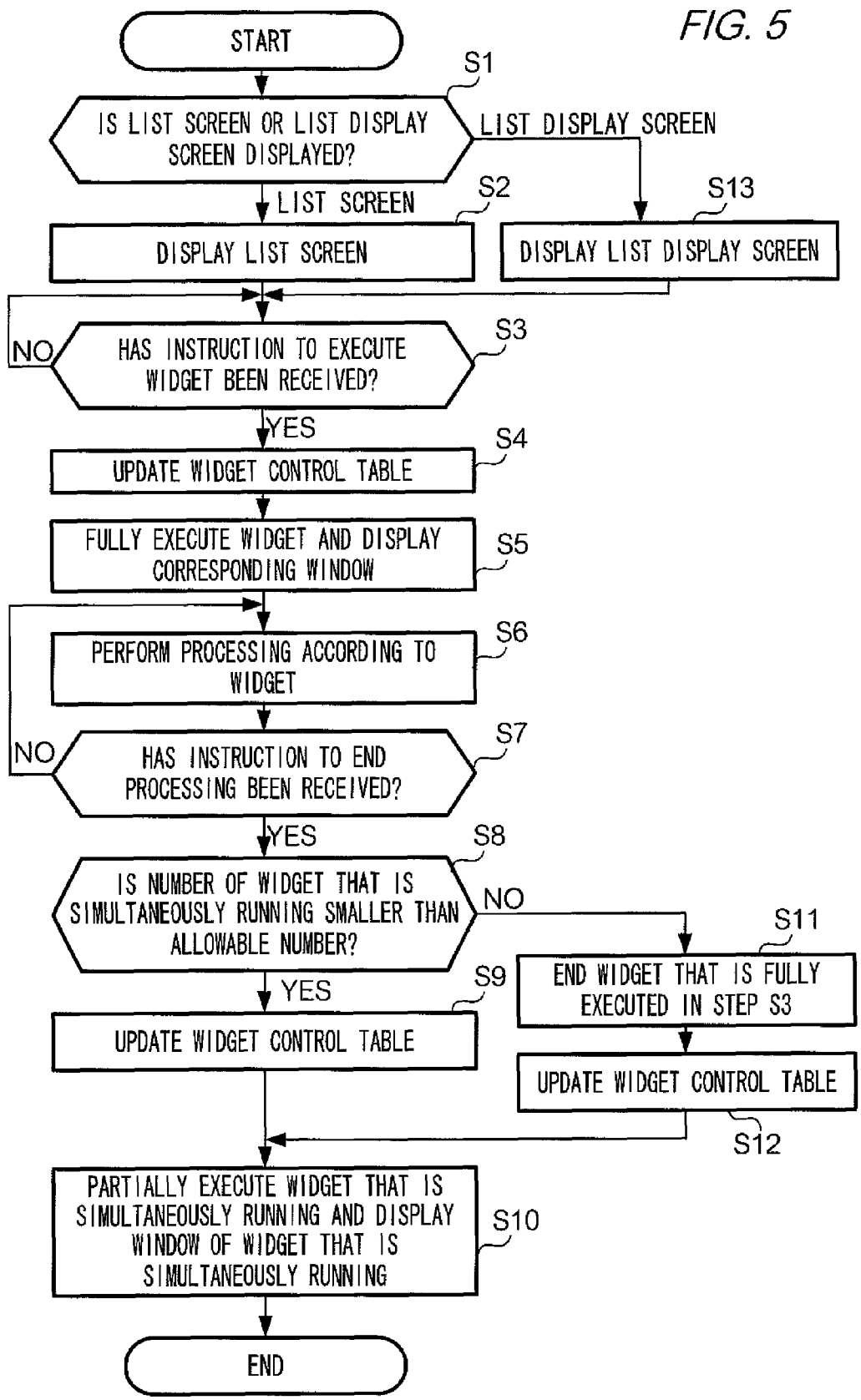
FIG. 5 is a flowchart showing a display control performed by a control unit of a communication terminal device.

FIG. 5 is a flowchart showing an operation carried out when a list display application program and a widget are executed by control unit 11. The following description is made of an operation performed when a widget is executed by communication terminal device 10. It is assumed that no widget has been executed yet prior to this operation.

Control unit 11 initially waits until receiving an instruction to display a list screen, or to display a list display screen by an operation of operation unit 14 by a user. If control unit 11 determines that the instruction to display the list screen has been received (step S1; list screen), control unit 11 displays on display unit 13 the list screen, on which appears a list of icons representing widgets that are executable by the device, as shown in FIG. 3 (step S2). Subsequently, control unit 11 waits until one of the icons is selected by an operation of operation unit 14 by a user so that execution of a widget is instructed (step S3; NO). If control unit 11 determines that one of the icons has been selected so that execution of a widget corresponding to the icon has been instructed (step S3; YES), control unit 11 proceeds to step S4. In this case, it is assumed that icon ICO1 (widget ID "001") shown in FIG. 3 is selected by a user, and controller 11 determines that an instruction to execute the clock widget has been received in step S3.

Figure 7:
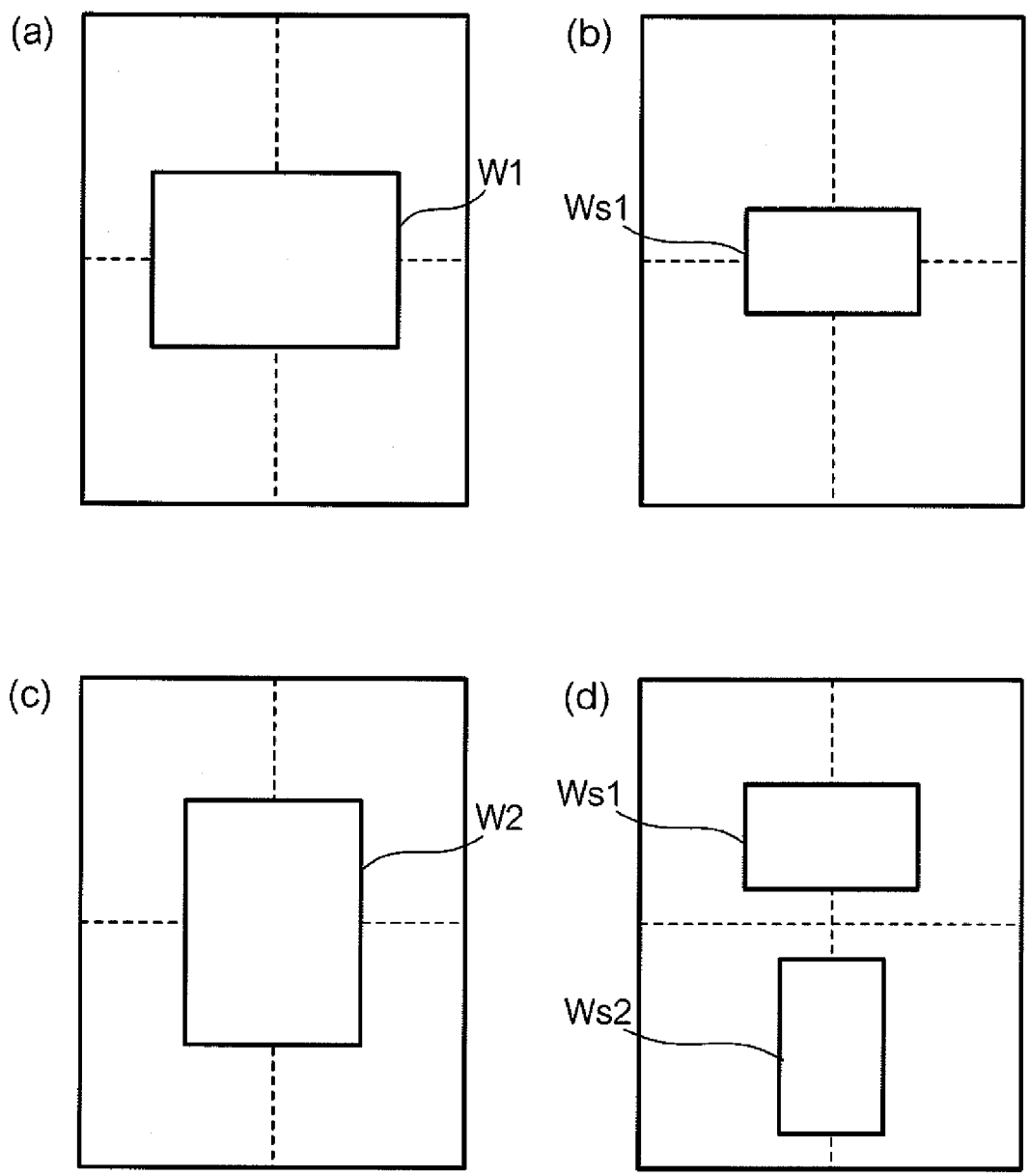
FIG. 7 is a diagram showing a display aspect of windows displayed on a display unit.

Subsequently, control unit 11 updates a widget control table (step S4). In this case, control unit 11 rewrites the widget control table such that the table has a content shown in FIG. 6(a). Specifically, control unit 11 writes widget ID "001" of the clock widget, and writes information "fully executed state" in a field "execution state" in association with the widget ID. Subsequently, control unit 11 fully executes a widget based on the content updated in step S4, and displays a window corresponding to the widget on display unit 13 (step S5). In this case, control unit 11 fully executes the clock widget, and displays on display unit 13a full execution screen on which window W1 corresponding to the clock widget appears, as shown in FIG. 7(a). In this case, since the clock widget is fully executed, control unit 11 uses a large part of a storage area of RAM 11c. Therefore, a widget other than the clock widget cannot be executed.

Control unit 11 performs processing related to the clock widget that is fully executed, in accordance with an operation of operation unit 14 by a user (step S6). The processing related to the clock widget includes processing to change an appearance, as described above. The processing is different from processing executed when the widget is partially executed.

Control unit 11 determines whether an instruction to end processing related to the fully executed widget has been received (step S7). When the determination is made, if a user operates operation unit 14 to change the full execution screen, which is currently displayed, to a list display screen, control unit 11 determines that the instruction to end processing of the fully executed widget has been received.

If control unit 11 makes a determination "YES" in step S7, control unit 11 determines whether the number of widgets running simultaneously is smaller than an allowable number (step S8). In this case, the allowable number, which is stored in ROM 11b, is "8." The allowable number is an upper limit determined in design stage on the basis of a relationship between a storage capacity of RAM 11c that is used for execution of widgets by communication terminal device 10, and an amount of storage that is required for partial execution of each widget. In other words, the allowable number is determined so that an amount of storage required for the partial execution of widgets does not exceed the storage capacity of RAM 11c that is assigned for execution of widgets.

In this case, since only the clock widget is executed, and therefore the number of widgets that is simultaneously running is "one," control unit 11 makes a determination "YES," and proceeds to step S9 to update the widget control table. In this case, control unit 11 rewrites the widget control table so that the table has a content shown in FIG. 6(b). Specifically, control unit 11 rewrites information in a field "execution state" associated with widget ID "001" of the clock widget from "fully executed state" to "partially executed state." According to this update, an execution state of all widget that is simultaneously running is changed to "partially executed state." Thereafter, control unit 11 displays on display unit 13 a list display screen on which a window corresponding to the partially executed widget appears (step S10). In this situation, control unit 11 assigns to the widget a storage area smaller than a storage area that is assigned to the widget in a fully executed state, to partially execute the widget. In this case, where the widget control table has been updated in step S9 so that the clock widget is partially executed, control unit 11 displays a list display screen on which window Ws 1 corresponding to the clock widget that is partially executed is displayed at the center of display unit 13, as shown in FIG. 7(b). Subsequently, control unit 11 returns to step S1, and waits until receiving an instruction to display a list screen, or to display a list display screen.

Subsequently, if the list screen is displayed on display unit 13 (step S2), and an instruction to newly execute another widget has been received (step S3; YES), control unit 11 executes the widget whose execution is instructed. If an instruction to execute the memo widget has been received, control unit 11 updates the widget control table so that the table has a content shown in FIG. 6(c) (step S4). Specifically, control unit 11 writes widget ID "002" of the memo widget in the widget control table, and writes information "fully executed state" as information on an execution state associated with the widget ID. In this case, since the other widget is already executed, control unit 11 rewrites information on an execution state of the widget that is already executed from "partially executed state" to "not-executed state." In this case, control unit 11 rewrites information on an execution state associated with widget ID "001" as "not-executed state." According to the operation, control unit 11 is able to fully execute another widget if a widget has been already executed. This is because, since the execution state is rewritten to "not-executed state," and therefore a storage area of RAM 11c assigned to the widget that was executed previously (in this case, the clock widget identified by widget ID "001") is released, a storage area of RAM 11c is assigned to the memo widget, which is fully executed newly.

Control unit 11 fully executes the memo widget, and displays on display unit 13a full execution screen on which window W2 corresponding to the memo widget appears, as shown in FIG. 7(c) (step S5).

Subsequently, control unit 11 performs steps S6 to S8, and updates the widget control table so that the table has a content shown in FIG. 6(d) to display a list display screen on display unit 13 (step S9). Specifically, control unit 11 rewrites information on an execution state associated with widget ID "002" from "fully executed state" to "partially executed state," to partially execute the memo widget. Control unit 11 also rewrites information on an execution state associated with widget ID "001" from "not-executed state" to "partially executed state," and assigns storage areas of RAM 11c to the widgets identified by widget ID "001" and "002" based on the widget control table. As a result, execution states of all widgets that are simultaneously running are changed to "partially executed state" by control unit 11. Control unit 11 displays on display unit 13a list display screen on which window Ws1 corresponding to the clock widget and window Ws2 corresponding to the memo widget appear (step S10).

Thereafter, control unit 11 executes the same processing steps as described above until the number of widgets running simultaneously reaches the allowable number "8." Specifically, in a case where a widget control table represents that the number of running widgets (partially executed) is smaller than the upper limit, and a new widget other than the running widget is to be executed, control unit 11 suspends execution of the running widget, and writes a widget ID of the widget as a widget ID of a widget whose execution is suspended, in a widget control table. Control unit 11 assigns a storage area of RAM 11c to the new widget to execute the widget. If an instruction to re-execute the widget whose execution is suspended has been received, control unit 11 assigns a storage area of RAM 11c to each of the running widget and the widget whose execution is suspended, and writes a widget ID of each of these widgets as a widget ID of a running widget in the widget control table, to execute the widgets in parallel.

Figure 8:
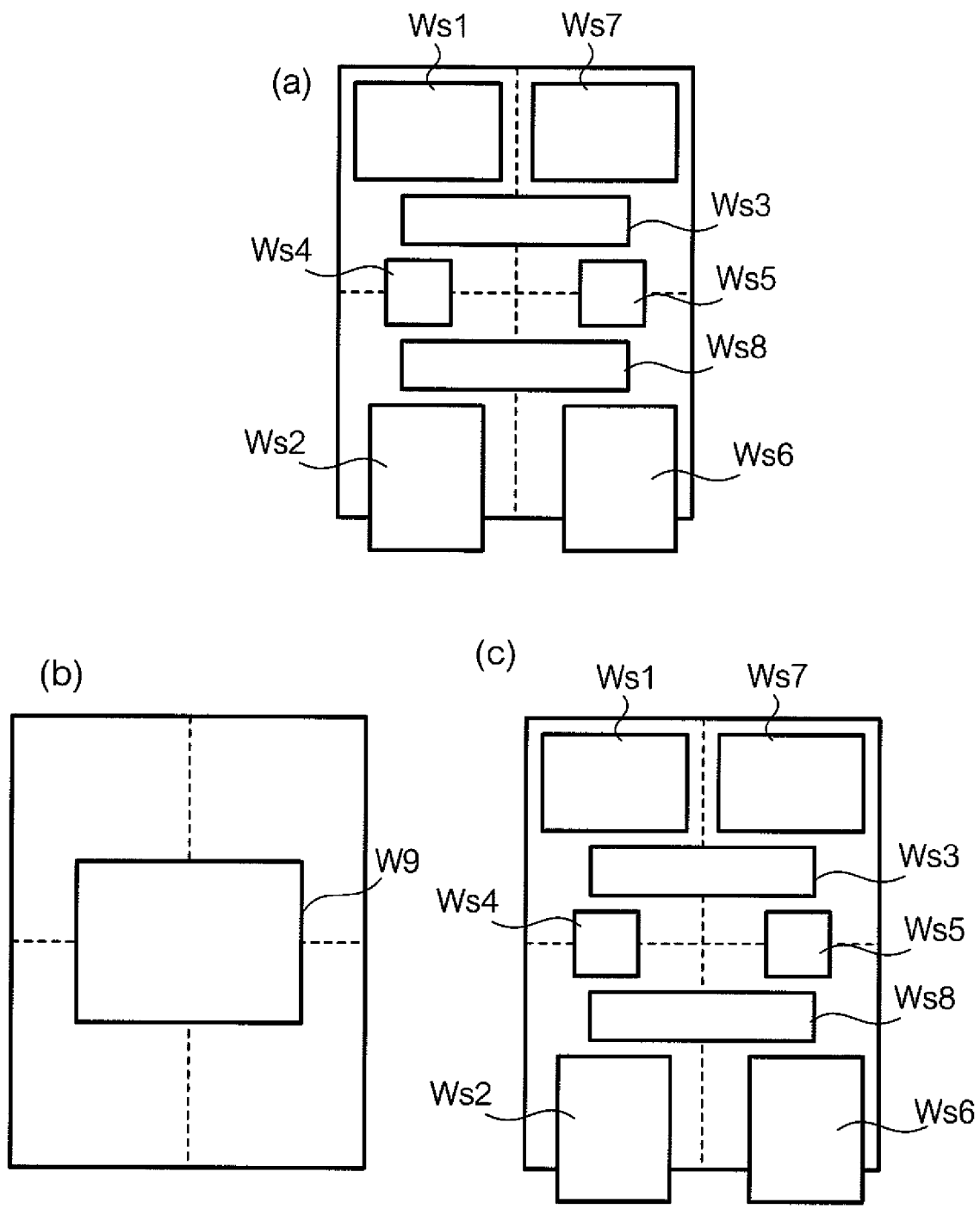
FIG. 8 is a diagram showing a display aspect of windows displayed on a display unit.

If control unit 11 simultaneously executes "8" widgets and displays a list display screen, the widget control table has a content as shown in FIG. 6(e). In the widget control table, in association with each of widget IDs "001" to "008" of the "8" widgets running simultaneously, information "partially executed state" is written as information on an execution state. For example, the list display screen has a display content as shown in FIG. 8(a). On the list display screen, windows Ws1 to Ws8 corresponding to the eight partially executed widgets are displayed. A part of some windows extends out of the display area, and therefore is not displayed; however, the part can be made visible by an operation of operation unit 14 by a user.

Next, description is made of an operation performed by control unit 11 when an instruction to execute a "ninth" widget, whose number exceeds the allowable number, has been received.

If an instruction to execute a "game widget," which is a "ninth" widget, has been received (step S3; YES), control unit 11 updates the widget control table so that the table has a content shown in FIG. 6(f) (step S4). Specifically, control unit 11 rewrites information on an execution state associated with each of widget IDs "001" to "008" of eight widgets that are already executed, from "partially executed state" to "not-executed state," and also writes information "fully executed state" in association with widget ID "009" of the game widget, which is to be newly executed. Control unit 11 accordingly releases all storage areas of RAM 11c that have been assigned to widget IDs "001" to "008," and assigns a storage area of RAM 11c to the widget identified by widget ID "009." Subsequently, control unit 11 displays on display unit 13a full execution screen on which window W9 corresponding to the game widget that is fully executed appears (step S5).

If a list display screen is displayed, since the number of widgets that are to be run simultaneously (the number of widgets whose execution state is "not-executed state" in the widget control table) is "8" which is the allowable number, control unit 11 makes a determination "NO" in step S8, and proceeds to step S11. After the number of widgets already executed reaches "8," control unit 11 ends the game widget executed in step S3 (step S11). Subsequently, control unit 11 updates the widget control table so that the table has a content shown in FIG. 6(g) (step S12). Specifically, control unit 11 rewrites information on an execution state associated with each of widget IDs "001" to "008" from "not-executed state" to "partially executed state," and also deletes widget ID "009" of the game widget that has been ended from the widget control table. Thereafter, control unit 11 releases a storage area of RAM 11c that is assigned to the game widget, and assigns a storage area of RAM 11c to each of widgets identified by widget IDs "001" to "008." As a result, in step S10 a list display screen as shown in FIG. 8(c) is displayed by control unit 11. The list display screen is the same as the previous list display screen that is displayed when "8" widgets are executed (FIG. 8(a)). Thereafter, control unit 11 ends a widget that was recently executed if a screen is returned to a list display screen, as long as the allowable number of widgets is running.

As is described in the foregoing, if the number of widget IDs of running widgets that is stored in a widget control table is equal to an upper limit, and a new widget other than the running widgets is to be executed, control unit 11 suspends execution of the running widgets, and writes a widget ID of each of the running widgets as a widget ID of a widget whose execution is suspended, in a widget control table. Thereafter, control unit 11 assigns a storage area of RAM 11c to the new widget to execute the widget. If an instruction to re-execute the widgets whose execution is suspended has been received, control unit 11 ends execution of the running new widget, and assigns a storage area of RAM 11c to each widget whose execution is suspended, and writes a widget ID of each of the widgets as a widget ID of a running widget in the widget control table, to execute the widgets in parallel.

Accordingly, in a case where an allowable number of widgets running simultaneously is set to be "8" based on a limitation of a storage capacity of RAM 11c, and an instruction to execute a widget has been newly received, control unit 11 temporarily suspends execution of a widget already executed, and fully executes the new widget using a storage area that becomes available as a result of the suspension. Also, when displaying a list display screen again, control unit 11 ends a "ninth" widget, and partially executes the "8" widgets that have been executed and are described in a widget table, using a storage area that becomes available as a result of end of the widget. Thus, communication terminal device 10 is able to execute a new application program even in a case where plural application programs are simultaneously running and the number of the application programs is equal to an allowable number. Also, after ending the new application program, communication terminal device 10 is able to restore the previous state in which the plural application programs are running simultaneously.

It is to be noted that if control unit 11 displays a list display screen in step S1 (step S1; list display screen), control unit 11 displays on display unit 13a list display screen on which a window corresponding to a partially executed widget appears, on the basis of a content of a widget control table at the time (step S13). Thereafter, if a certain window is selected by a user (step S3; YES), control unit 11 accordingly updates the widget control table (step S4), changes an execution state of a widget corresponding to the selected window from "partially executed state" to "fully executed state," and temporarily suspends another widget that is partially executed (step S5). Subsequently, control unit 11 performs the same processing steps as described above.

According to the embodiment described above, when executing plural widgets in parallel, control unit 11 of communication terminal device 10 executes the widgets in a partially executed state, in which a small storage area of RAM 11c is assigned to each widget, so that a part of a function that is implemented by execution of each widget is provided. On the other hand, when providing a service of high value to a user, control unit 11 assigns a large storage area of RAM 11c to either one of the widgets to fully execute the widget so that a full function implemented by the execution is provided. According to the control of execution states of plural widgets, it is possible to provide both an environment for responding to a user's demand for a variety of uses by executing plural widgets, and an environment for providing a service of high value to a user by executing a widget.

The present invention may be implemented in an embodiment that is different from the above embodiment. For example, the present invention may be implemented in the embodiments described below. It is to be noted that the following modifications may be combined with each other.

In the above embodiment, control unit 11 ends a widget that is executed in step S3 (namely, a widget most recently executed) after the number of widgets already executed reaches an allowable number, and deletes information on the widget from the widget control table. However, control unit 11 may end a widget other than the widget most recently executed. The following configuration may be employed for determining a widget to be ended.

Figure 9:
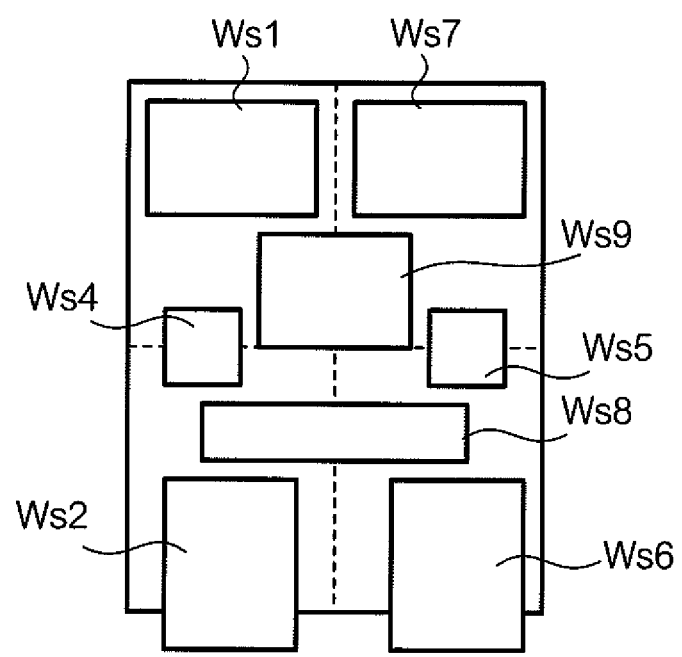
FIG. 9 is a diagram showing a display aspect of windows displayed on a display unit.

After making a determination "NO" in step S8, control unit 11 may display a screen on display unit 13 to ask a user which widget is to be ended. For example, control unit 11 may display on display unit 13a screen on which a plurality of soft buttons appear, each describing a name of a running widget, to prompt a user to select a widget to be ended. Control unit 11 ends a widget corresponding to a soft button selected by a user, and changes an execution state of a widget that is executed most recently from a fully executed state to a partially executed state. Control unit 11 also changes an execution state of a widget whose execution is suspended (other than the widget that has been ended by a user selection) to a partially executed state. By this configuration, if a user makes an instruction to end a widget corresponding to window Ws3 shown in FIG. 8(a), control unit 11 displays on the list display screen window Ws9 corresponding to the game widget, instead of window Ws3, as shown in FIG. 9.

"Execution priority level" may be defined for each widget, and a widget having a lower priority level may be ended. The priority level is determined based on usage of each widget or designation by a user, and information on the priority level is stored in EEPROM 11d.

According to the configuration, control unit 11 identifies a widget ID of a widget that has a lower execution priority level among widget IDs described in the widget control table in association with information on an execution state of "not-executed state," in step S11 of FIG. 5, and ends the execution of the widget. Subsequently, control unit 11 assigns a storage area of RAM 11c to a fully executed widget, and a widget whose execution state is "not-executed state," which is not the widget whose execution has been ended because the widget has a lower priority level. Subsequently, control unit 11 partially executes these widgets in parallel.

For example, control unit 11 determines a priority level based on a period in which each widget is running In this case, communication terminal device 10 includes time measurement means, such as a timer, and control unit 11 measures using the time measurement means a period (time) in which each widget ID is described in the widget control table in association with information on an execution state of "partially executed state" or "not-executed state," and describes the period in the widget control table. The period described in association with each widget ID is a period in which identification information of a running application program, or identification information of an application program whose execution is suspended, is described in the widget control table. In step S11 shown in FIG. 5, control unit 11 determines a priority level based on a period described in the widget control table. If the period is short, it may mean that a period in which a user has used a widget is short. In this case, control unit 11 may give a lower priority level to a widget because the widget is not so important for a user. Conversely, when the period is short, it may mean that a user has started using a widget recently, and therefore the widget is important for a user at the time. In this case, control unit 11 may give a lower priority level to a widget as the period becomes longer. In step S11 shown in FIG. 5, control unit 11 ends a widget having a lower priority level that is described in the widget control table.

Alternatively, control unit 11 may measure a period in which each widget ID is described in the widget control table in association with information on an execution state of "fully executed state," and may describe the period in the widget control table. The period in which the widget ID is described in association with information on execution state of "fully executed state" is a period in which a new application program is running after an application program that has been running has been suspended. In this case, as in the case described above, if the period is short, it may mean that a period in which a widget has been used by a user is short. Therefore, control unit 11 may give a lower priority level to a widget because the widget is not so important for a user. Conversely, the fact that the period is short may mean that a user has started using a widget recently, and therefore the widget is important for a user at the time. It is to be noted that since a period in which a widget ID is described in association with information on an execution state of "fully executed state" is considered as a period in which a more useful service is provided to a user, than a period in which the widget ID is described in associated with information on an execution state of "partially executed state" or "not-executed state"; thus, the period is suitable for use in determining a priority level that is based on utilization by a user. In this case, as in the case described above, control unit 11 ends a widget having the lower priority level that is described in the widget control table.

Alternatively, control unit 11 may determine a priority level based on a timing at which an application program is executed (started), instead of the above period. In this case, control unit 11 gives a higher priority level to an application program that was executed recently. According to this configuration, it is possible to display a window of a highly prioritized application program that has been used often by a user recently, on a list display screen.

Alternatively, control unit 11 may measure the number of times each widget ID is described in the widget control table in associated with information on an execution state of "partially executed state" or "not-executed state," and describe the number of times in the widget control table. The number of times described in associated with information on an execution state of "partially executed state" or "not-executed state" is the number of times identification information of running application program, or identification information of an application program, whose execution is suspended, is described in the widget control table. In step S11 shown in FIG. 5, control unit 11 determines a priority level based on the number of times described in the widget control table. If the number of times is small, it may mean that the number of times in which a user uses a widget is small. In this case, control unit 11 may determine a lower priority level for a widget because the widget is not so important for a user. Conversely, if the number of times is small, it may mean that a user has started using a widget recently, and therefore the widget is important for a user at the time. In this case, control unit 11 determines a lower priority level for a widget as the number of times becomes larger. In step S11 shown in FIG. 5, control unit 11 ends a widget having the lower priority level that is described in the widget control table.

Alternatively, control unit 11 may measure the number of times each widget ID is described in the widget control table in association with information on the execution state of "fully executed state," and describe the number of times in the widget control table. The number of times the widget ID is described in associated with information on the execution state of "fully executed state" is the number of times a new application program is executed after execution of an application program that has been running has been suspended. In this case, as in the case described above, since the number of times a widget ID is described in association with information on the execution state of "fully executed state" is considered as a period in which a more useful service is provided to a user, than the number of times the widget ID is described in association with information on the execution state of "partially executed state" or "not-executed state;" thus, the period is suitable for use in determining a priority level that is based on utilization by a user. In this case, as in the case described above, control unit 11 ends a widget having the lower priority level that is described in the widget control table, in step S11 shown in FIG. 5.

In the above embodiment, when a widget is to be fully executed, control unit 11 refers to all of a procedure described in the widget, and performs processing according to the procedure. On the other hand, when a widget is to be partially executed, control unit 11 refers to a predetermined part of a procedure described in the widget, and performs processing according to the part of the procedure.

Namely, in the above embodiment, the same widget is used when a widget is fully executed and when a widget is partially executed. However, widgets that have the same purpose of service, but are different programs, may be used when a widget is fully executed and when a widget is partially executed. In this case, a set of widgets of a type that includes a widget used when full execution is carried out and a widget used when partial execution is carried out may be provided.

In the present invention, a widget can execute plural different processing in the partially executed state.

In the above embodiment, "selection" of a window means providing an input focus to the window, and specifying the window. However, "selection" of a window may mean only providing an input focus. In this case, communication terminal device 10 performs different processing depending on whether it is in a "selected period" in which a window is selected, or a "non-selected period" in which a window is not selected. For example, communication terminal device 10 displays a time and date in a predetermined display appearance during a non-selected period, and displays a time and date in a display appearance different from that of the non-selected period, during the selected period. In this case, communication terminal device 10 may display only time during the non-selected period, and display the date and day of the week in addition to time during the selected period. In either selected period or non-selected period, a widget is executed partially, although a different range of procedures that is described in a widget is referred to by communication terminal device 10. In this case, if a selected window is specified, for example, by pressing of a predetermined key by a user, communication terminal device 10 changes an execution state of the widget from a partially executed state to a fully executed state.

A window according to the present invention may be not only a display area assigned to a "widget" of the above embodiment, but also a display area assigned to another application program such as a native application program. Also, a widget may be not only a Java application program, but also another application program. Also, in the above embodiment where display of plural windows is enabled by executing a list display application program, which is a Java application program, display of plural windows may be enabled by another application program such as an OS.

Also, a widget may acquire information via a means other than wireless communication unit 12. For example, if an information-processing device according to the present invention has a so-called IC tag, a widget may acquire information stored in the IC tag. Alternatively, if an information-processing device according to the present invention has a GPS positioning function, a widget may acquire location information (a latitude and longitude or a distance from a given point) using the positioning function.

In the above embodiment, a user inputs instructions by operating keys of operation unit 14. However, soft keys, which correspond to keys of operation unit 14, may be displayed on display unit 13 and may be used to input instructions. Alternatively, if communication terminal device 10 has a touch panel, soft buttons on the touch panel may be used as operation keys.

In the above embodiment, control unit 11 may be deemed as corresponding to an information-processing device according to the present invention, and communication terminal device 10 may be deemed as corresponding to the information-processing device.

An operation according to the present invention may be not only a pressing of a key, but also recognition of a vocal instruction.

In the present invention, an arrangement of images such as icons may be changed, instead of an arrangement of windows. In other words, "window" referred in the present invention includes an image such as an icon.

In the above embodiment, an allowable number of widgets that can be run simultaneously is "8"; however, the number may be more than 8 or less than 8. As described in the embodiment, the allowable number is determined on the basis of a relationship between a storage capacity of a work area of RAM 11c and a storage amount required for execution of a widget. For example, if storage capacity of RAM 11c is increased, control unit 11 is able to execute more widgets simultaneously (in a partially executed state); thus, an allowable number may be increased.

The above embodiment is an embodiment in which the present invention is applied to a mobile phone. However, the present invention may be applied to another electronic device. The present invention may be applied to a communication terminal device such as a PDA (Personal Digital Assistance), or an information-processing device such as a camera, a portable music player, or a portable game device.

The functions that are realized by control unit 11 of communication terminal device 10 may be realized by a collection of programs or cooperation of plural hardware resources.

What is claimed is:

1. An information-processing device comprising:
a memory;
an execution means for assigning a storage area of the memory to each of a plurality of application programs, to execute the application program;
a storage means for storing first identification information that represents a state in which an application program is running, or second identification information that represents a state in which execution of an application program is suspended, for each application program, wherein:
(a) in a case where at least one first application program is running, a total number of the first identification information stored in the storage means is smaller than an allowable number of application programs, and a second application program is to be executed, the execution means:
suspends execution of the at least one first application program, and rewrites identification information of the at least one first application program that is stored in the storage means, as the second identification information,
assigns a first amount of the storage area to the second application program, to execute the second application program, and
when the second application program is running, and an instruction to execute the first application program has been received, reassigns to the second application program a second amount of the storage area smaller than the first amount of the storage area, and assigns the second amount of the storage area to the at least one first application program, to execute the first application program and the second application program in parallel, and rewrites identification information of each of the at least one first application program and the second application program, as the first identification; and
(b) in a case where the at least one first application program is running, a total number of the first identification information stored in the storage means is equal to the allowable number, and the second application program is to be executed, the execution means:
suspends execution of the at least one first application program, and rewrites identification information of the first application program that is stored in the storage means, as the second identification information,
assigns the first amount of the storage area of the memory to the second application program, to execute the second application program,
when the second application program is running, and an instruction to execute the at least one first application program has been received, ends the second application program, and assigns the second amount of the storage area to each of the at least one first application program, to execute the first application program in parallel with other running applications, and rewrites identification information of the at least one first application program, as the first identification information, and
the second application program is an application program for implementing a full function when the first amount of the storage area is assigned to the application program, and for implementing a part of the function when the second amount of the storage area is assigned to the application program.

2. The information-processing device according to claim 1, wherein in the case (b), if an instruction has been received to execute the at least one first application program whose execution is suspended, the execution means:
identifies a third application program that has a lower priority level among application programs for which the second identification information is written, and ends execution of the third application program, instead of ending execution of the second application program; and assigns the second amount of the storage area to each of the running second application program and the at least one first application program for which the second identification information is written, other than the third application program, to execute the application programs in parallel, and updates identification information of the application programs to which the second amount of the storage area is assigned, to the first identification information.

3. The information-processing device according to claim 2, wherein the execution means specifies, based on a period in which the first identification information or the second identification information related to an application program is stored, a priority level of the application program.

4. The information-processing device according to claim 2, wherein the execution means specifies, based on a period in which one application program is executed after execution of another application is suspended, a priority level of the one application program.

5. The information-processing device according to claim 2, wherein the execution means specifies, based on a number of times the first identification information or the second identification information related to an application program is stored, a priority level of the application program.

6. The information-processing device according to claim 2, wherein the execution means specifies, based on a number of times one application program is executed after execution of another application program is suspended, a priority level of the one application program.

7. A non-transitory computer-readable medium storing a program for causing a computer to execute a program for causing a computer to execute the steps of:
assigning a storage area of a memory to each of a plurality of application programs, to execute the application program; and
storing in a storage means first identification information that represents a state in which an application program is running, or second identification information that represents a state in which execution of an application program is suspended, for each application program, wherein:
(a) in a case where at least one first application program is running, a total number of the first identification information stored in the storage means is smaller than an allowable number of application programs, and a second application program is to be executed,
execution of the at least one first application program is suspended, and identification information of the at least one first application program that is stored in the storage means is rewritten as the second identification information,
a first amount of the storage area is assigned to the second application program so that the second application program is executed, and
when the second application program is running, and an instruction to execute the first application program has been received, a second amount of the storage area smaller than the first amount of the storage area is reassigned to the second application program, and the second amount of the storage area is assigned to the at least one first application program so that the first application program and the second application program are executed in parallel, and identification information of each of the at least one first application program and the second application program is rewritten as the first identification information; and (b) in a case where the at least one first application program is running, a total number of items of the first identification information stored in the storage means is equal to the allowable number, and the second application program is to be executed,
execution of the at least one first application program is suspended, and identification information of the first application program that is stored in the storage means is rewritten as the second identification information,
the first amount of the storage area of the memory is assigned to the second application program so that the second application program is executed,
when the second application program is running, and an instruction to execute the at least one first application program has been received, the second application program is ended, and the second amount of the storage area is assigned to each of the at least one first application program so that the first application program is executed in parallel with other running applications, and identification information of the at least one first application program is rewritten as the first identification information, and
the second application program is an application program for implementing a full function when the first amount of the storage area is assigned to the application program, and for implementing a part of the function when the second amount of the storage area is assigned to the application program.

8. An information-processing device comprising:
a memory;
an execution means for assigning a storage area of the memory to each of a plurality of application programs, to execute the application program; and
a storage means for storing any one of first identification information that represents a full execution state in which an application program can perform all of its function, second identification information that represents a partial execution state in which an application program can perform a part of its function, and third identification information that represents a state in which execution of an application program is suspended, for each application program,
wherein
(a) in a case where at least one first application program is running, a total number of the second identification information stored in the storage means is smaller than an allowable number of application programs, and a second application program is to be executed, the execution means:
suspends execution of the at least one first application program, rewrites identification information of the at least one first application program stored in the storage means, as the third identification information, assigns a first amount of storage area to the second application program, to execute the second application program in the full execution state, and rewrites identification information of the second application program as the first identification information, and
when the second application program is running, and an instruction to execute the first application program has been received, reassigns to the second application program a second amount of the storage area smaller than the first amount of the storage area, and assigns the second amount of the storage area to the at least one first application program, to execute the first application program and the second application program in parallel in the partial execution state, and rewrites identification information of each of the at least one first application program and the second application program, as the second identification; and (b) in a case where the at least one first application program is running, a total number of the second identification information stored in the storage means is equal to the allowable number, and the second application program is to be executed, the execution means:

suspends execution of the at least one first application program, rewrites identification information of the at least one first application program that is stored in the storage means, as the second identification information, assigns the first amount of the storage area of the memory to the second application program, to execute the second application program in the full execution state, and rewrites identification information of the second application program as the first identification information, when the second application program is running, and an instruction to execute the at least one first application program has been received, ends the second application program, assigns the second amount of the storage area to each of the at least one first application program, to execute the first application program in parallel in the partial execution state with other running applications, and rewrites identification information of the at least one first application program, as the second identification information, and the second application program is an application program for implementing a full function when the first amount of the storage area is assigned to the application program, and for implementing a part of the function when the second amount of the storage area is assigned to the application program.

* * * * *